United States Patent [19]

Adam

[11] 4,294,768
[45] Oct. 13, 1981

[54] WATER-SOLUBLE ANTHRAQUINONE DYES

[75] Inventor: Jean-Marie Adam, Saint-Louis, France

[73] Assignee: Ciba-Geigy Corporation, Ardsley, N.Y.

[21] Appl. No.: 148,443

[22] Filed: May 9, 1980

Related U.S. Application Data

[63] Continuation of Ser. No. 908,495, May 23, 1978, abandoned.

[30] Foreign Application Priority Data

May 26, 1977 [LU] Luxembourg ............................ 77419

[51] Int. Cl.³ ......................................... C07C 143/675
[52] U.S. Cl. ..................................... 260/372; 260/373
[58] Field of Search ............... 260/369, 372, 373, 374, 260/377

[56] References Cited

U.S. PATENT DOCUMENTS

| | | |
|---|---|---|
| 2,541,623 | 2/1951 | von Allmen et al. ................ 260/372 |
| 2,580,190 | 12/1951 | Peter et al. ........................... 260/373 |
| 3,823,168 | 7/1974 | Hohmann et al. ................... 260/377 |
| 4,224,228 | 9/1980 | Adam .................................. 260/372 |

FOREIGN PATENT DOCUMENTS 440505 12/1967 Switzerland ......................... 260/372

*Primary Examiner*—Winston A. Douglas
*Assistant Examiner*—Raymond K. Covington
*Attorney, Agent, or Firm*—Edward McC. Roberts; John P. Spitals

[57] ABSTRACT

There are described new violet water-soluble anthraquinone dyes corresponding to the formula

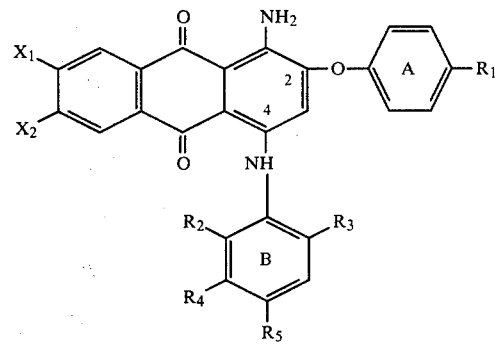

wherein
  $R_1$ represents a straight-chain or branched-chain alkyl group having 4 to 8 carbon atoms,
  $R_2$ and $R_3$ independently of one another represent a straight-chain or branched-chain alkyl group having 1 to 4 carbon atoms,
  $R_4$ represents hydrogen, an optionally acylated amino group, or a fibre-reactive radical bonded by way of an amino group,
  $R_5$ represents hydrogen or a straight-chain or branched-chain alkyl group having 1 to 4 carbon atoms, and the phenyl rings A and/or B can be further substituted, with the proviso that one X of the symbols $X_1$ and $X_2$ represents the $-SO_3H$ — group, and the other X represents hydrogen; and also a process for producing these dyes by means of a phenol melt; and the use of the new water-soluble anthraquinone dyes for dyeing and printing textile materials, particularly natural and synthetic polyamide materials.

10 Claims, No Drawings

WATER-SOLUBLE ANTHRAQUINONE DYES

This is a Continuation of application Ser. No. 908,495 filed on May 23, 1978 now abandoned.

The invention relates to new water-soluble anthraquinone dyes, to processes for producing these dyes, to their use for dyeing or printing textile materials, particular natural and synthetic polyamide materials, and also to the textile material dyed and printed with these new anthraquinone dyes.

Violet dyes which have a good affinity for natural and synthetic polyamide material are much in demand. From the German Pat. No. 821,384, there are known violet milling dyes of the anthraquinone series, but these dyes have poor affinity for polyamide materials.

It has now been found that by reaction of specific anthraquinonedisulphonic acids with a melted p-alkylphenol, there are obtained violet anthraquinonemonosulphonic acids having a p-alkylphenoxy group in the 2-position, which surprisingly have very good affinity for polyamide materials.

The invention thus relates to new water-soluble anthraquinone dyes which, in the form of the free acid, correspond to the formula I

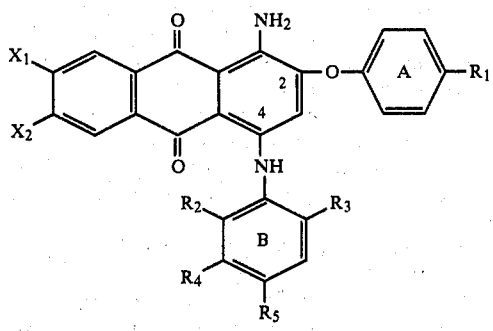

wherein
- $R_1$ represents a straight-chain or branched-chain alkyl group having 4 to 8 carbon atoms,
- $R_2$ and $R_3$ independently of one another represent a straight-chain or branched-chain alkyl group having 1 to 4 carbon atoms,
- $R_4$ represents hydrogen, an optionally acylated amino group, or a fibre-reactive radical bonded by way of an amino group,
- $R_5$ represents hydrogen or a straight-chain or branched-chain alkyl group having 1 to 4 carbon atoms, and the phenylene rings A and/or B can be further substituted, with the proviso that one X of the symbols $X_1$ and $X_2$ represents the —$SO_3H$— group, and the other X represents hydrogen.

As a straight-chain or branched-chain alkyl group having 4 to 8 carbon atoms, $R_1$ represents for example the following groups: the n-, sec- or tert-butyl group; and the n-, sec- or tert-phenyl, hexyl, heptyl or octyl group; in preferred anthraquinone dyes, $R_1$ represents a branched-chain alkyl group having 4 to 8 carbon atoms, particularly the tert-butyl group.

As a straight-chain or branched-chain alkyl group having 1 to 4 carbon atoms, $R_2$, $R_3$ and $R_5$ represent, for example, the methyl, ethyl, n- and iso-propyl groups and the n-, sec- and tert-butyl groups. In preferred anthraquinone dyes, $R_2$ and $R_3$ each represent the methyl group, and $R_5$ represents an alkyl group having 1 or 2 carbon atoms.

If $R_4$ represents an amino group, this can be monosubstituted on the N atom; for example it is an alkylamino group, such as the methylamino or ethylamino group.

If $R_4$ represents an acylated amino group, these $R_4$ groups correspond in particular to the formula —NH—CO.X or —NHSO$_2$X wherein X represents an alkyl group, especially the methyl group, or an aryl group, particularly the phenyl group.

If $R_4$ represents an amino group to which a fibre-reactive radical is bonded, these $R_4$ groups correspond to the formula —NHZ, wherein Z represents a fibre-reactive radical.

By a fibre-reactive radical Z is meant a radical containing one or more reactive groups or substituents that can be split off, which are able to react on application of the dyes to, for example, superpolyamide fibres, such as wool, with the NH-groups of these fibres to form covalent bonds. Fibre-reactive groupings of this kind are known in large numbers from the literature.

Suitable fibre-reactive groupings Z are for example those of the aliphatic series, such as acryloyl, mono-, di- or trichloroacryloyl or mono-, di- or tribromoacryloyl, such as —CO—CH=CH—Cl, —CO—CCl=CH$_2$, —CO—CH=CH—Br, —CO—CBr=CH$_2$, —CO—CBr=CHBr, —CO—CCl=CH—CH$_3$, also —CO—CCl=CH—COOH, —CO—CH=C-Cl—COOH, and β-chloropropionyl, 3-phenylsulphonylpropionyl, 3-methylsulphonylpropionyl, β-sulphatoethylaminosulphonyl, vinylsulphonyl, β-chloroethylsulphonyl, β-sulphatoethylsulphonyl, β-methylsulphonylethylsulphonyl, β-phenylsulphonylethylsulphonyl, 2-fluoro-2-chloro-3,3-difluorocyclobutane-1-carbonyl, 2,2,3,3-tetrafluorocyclobutanecarbonyl-1 or -sulphonyl-1 groups, or β-(2,2,3,3-tetrafluorocyclobutyl-1)-acryloyl groups, or α- or β-alkyl- or -arylsulphonylacryloyl groups, such as α- or β-methylsulphonylacryloyl.

Reactive radicals particularly suitable for polyamide, especially for wool, are, for example: chloroacetyl, bromoacetyl, α,β-dichloro- or α-β-dibromopropionyl, α-chloro- or α-bromacroyl, 2,4,6-trifluoropyrimidyl-5 or 2,4,6-trifluorotriazinyl groups, as well as fluorotriazinyl groups of the formula

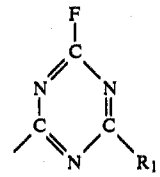

wherein $R_1$ represents an optionally substituted amino group or an optionally etherified oxy or thio group, such as the NH$_2$ group, an amino group mono- or disubstituted with $C_1$–$C_4$-alkyl groups, a $C_1$–$C_4$-alkoxy group, a $C_1$–$C_4$-alkylmercapto group, arylamino, especially phenylamino, or phenylamino, phenoxy, mono- or disulphophenyloxy, etc., substituted with methyl, methoxy, chlorine and particularly sulpho. Examples of such triazine compounds are: 2,4-difluoro-6-aminotriazine, 2,4-difluoro-6-methylaminotriazine, 2,4-difluoro-6-ethylaminotriazine, 2,4-difluoro-6-phenylaminotriazine, 2,4-difluoro-6-(2'-, 3'- or 4'-sulphophenyl)-aminotriazine, 2,4-difluoro-6-(2',4'- or 3',4'- or 2',5'- or 4',5'-disulphophenyl)-aminotriazine, 2,4-difluoro-6-dimethylaminotriazine, 2,4-difluoro-6-methoxytriazine, 2,4-difluoro-6-(β-methoxyethoxy)-triazine, 2,4-difluoro-6-methylmercaptotriazine or 2,4-difluoro-6-phenylmercaptotriazine.

Reactive radicals Z which are particularly preferred are the α-bromoacryloyl group and the α,β-dibromopropionyl group. The first-mentioned can be introduced by means of bromoacrylic acid chloride, or from the α,β-dibromopropionyl group by splitting off hydrogen bromide. This applies analogously also to the α-chloroacrylic group. Likewise of interest are the 4,6-difluorotriazinyl-(2) group or the 4-fluoro-6-alkyl- or -arylaminotriazinyl-(2) groups.

In preferred anthraquinone dyes of the formula I, $R_4$ represents hydrogen.

If the phenylene rings A and/or B are further substituted, suitable substituents are, for example: halogen such as fluorine, chlorine or bromine, as well as the radical —CH$_2$.NH.CO.Y wherein Y represents an alkyl group or alkenyl group optionally mono- or disubstituted by halogen, such as fluorine, chlorine or bromine, or an unsubstituted phenyl group.

Particularly interesting anthraquinone dyes correspond to the formula I wherein $R_1$ represents the tert-butyl group, $R_2$, $R_3$ and $R_5$ each represent the methyl group, $R_4$ represents hydrogen, and one of the symbols $X_1$ and $X_2$ represents hydrogen and the other the sulpho group, and wherein the phenylene rings A and/or B are not further substituted.

The new water-soluble anthraquinone dyes of the formula I are bluish-violet dyes, which are characterised in particular by good affinity, good build-up properties and pure shades on polyamide materials, and by good fastness to wet processing, such as fastness to hot water, fastness to perspiration and fastness to washing.

The new anthraquinone compounds of the formula I are obtained by reacting an anthraquinone compound which, in the form of the free acid, corresponds to the formula II

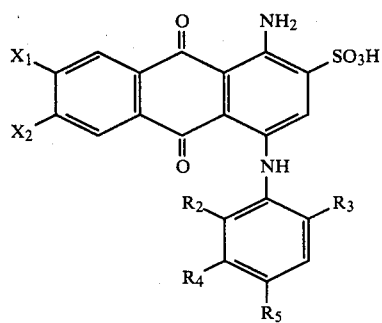

(II)

wherein the symbols $R_2$, $R_3$, $R_4$, $R_5$, $X_1$ and $X_2$ have the aforesaid meanings, with a p-alkylphenol of the formula III

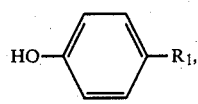

(III)

wherein $R_1$ has the aforesaid meaning, in the presence of acid-binding agents and at elevated temperature, to give an anthraquinone compound of the formula Ia

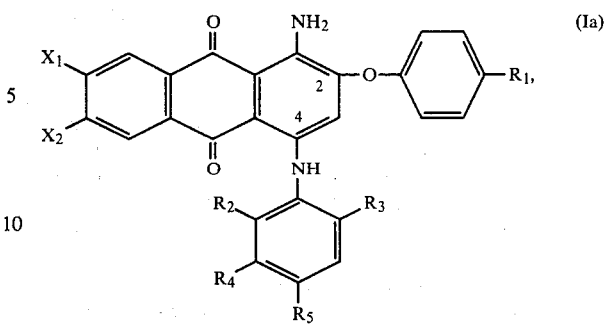

(Ia)

wherein the symbols $R_1$, $R_2$, $R_3$, $R_4$, $R_5$, $X_1$ and $X_2$ have the aforementioned meanings; and optionally further substituting the phenylene ring of the phenoxy group in the 2-position, and/or the phenylene ring in the 4-position, of the anthraquinone nucleus.

In the case where the radical $R_4$ in the anthraquinone dyes of the formula I represents an acylated amino group or a fibre-reactive radical —NHZ, it is advantageous to use a starting compound of the formula II in which $R_4$ represents an amino group that can be acylated, and to react this with the phenol of the formula III. This reaction product can then be subsequently reacted with a compound introducing the acyl group or the fibre-reactive radical Z to yield an acylated or fibre-reactive anthraquinone dye. Acyl compounds suitable for this purpose are, for example, those on which the reactive groups mentioned are based, in general halides, particularly chlorides, of the started components, the condensation reaction being generally performed in an aqueous or organic medium, and in an alkaline to acid range.

The compounds of the formulae II and III are known and can be produced by known methods.

A suitable compound of the formula II is for example 1-amino-4-mesidinoanthraquinone-2,6-disulphonic acid, and of the formula III for example p-tert-butylphenol.

The reaction of the anthraquinone compound of the formula II with the phenol of the formula III is performed preferably at a temperature of 180° to 240° C., particularly at 220° C., and this reaction is preferably performed with a melt of the phenol of the formula III.

Suitable acid-binding agents are, for example, the hydroxides of alkali metals, preferably of potassium and sodium, such as potassium hydroxide or sodium hydroxide.

If the phenylene ring A and/or B of the anthraquinone compound of the formula I is further substituted, for example by the stated group —CH$_2$.NH.CO.Y, such compounds are produced for example by a process wherein the anthraquinone compound of the formula Ia is reacted according to Tscherniak-Einhorn with an N-methylolamide carrying the group —COY on the N atom, in an acid medium, preferably in concentrated sulphuric acid.

If the phenylene ring A and/or B is further substituted by halogen, such compounds are obtained, for example, by halogenating a compound Ia with, e.g., bromine/acetic acid or hydrochloric acid by known methods.

The new anthraquinone dyes free from fibre-reactive groups are used in particular for dyeing or printing natural and synthetic polyamide materials, such as wool and nylon. If they are fibre-reactive anthraquinone dyes, they can be used for dyeing or printing cellulose materials or natural and synthetic polyamide materials, and for dyeing mixed fabrics, for example made from wool and cellulose.

The invention is further illustrated by the following Examples but is not limited to them. The term 'parts' denotes parts by weight, and temperature values are in degrees Centigrade.

EXAMPLE 1

A mixture of 200 parts of p-tert-butylphenol with 60 parts of a 50% potassium hydroxide solution is dehydrated until a temperature of 180° is attained; there are then added 56 parts of the condensation product from 1-amino-4-bromoanthraquinone-2,6-disulphonic acid with 2,4,6-trimethylaniline (mesidine), and the mixture is condensed at 220° for 2 hours. It is subsequently diluted at 100° with 600 ml of a 10% sodium hydroxide solution; the dye which has precipitated is filtered off under suction and washed with 10% solution hydroxide solution. The p-tert-butylphenol still present is distilled off by means of steam distillation, and the dye of the formula

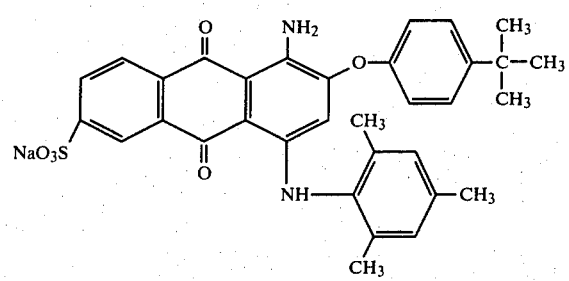

is isolated. This dyes polyamide fibres in bluish-violet shades, with a very good affinity.

By using, instead of the 56 parts of the condensation product from 1-amino-4-bromoanthraquinone-2,6-disulphonic acid with mesidine, equivalent parts of the condensation products of the Formula II, listed in Table I, and reacting these with equivalent parts of the phenols of the formula III, the procedure otherwise remaining the same, there are obtained anthraquinone dyes of which the shade on polyamide is shown in the last column of the Table I which follows.

TABLE I

Condensation product of the formula II

| Ex. | $X_1$ | $X_2$ | B | Phenol of the formula III | Shade on polyamide |
|---|---|---|---|---|---|
| 2 | H | $SO_3H$ | 2,6-dimethylphenyl | HO—⟨⟩—tert-butyl | bluish-violet |
| 3 | H | $SO_3H$ | 2-methyl-6-ethylphenyl | " | bluish-violet |
| 4 | H | $SO_3H$ | 2,4,6-trimethylphenyl | HO—⟨⟩—iso-octyl | bluish-violet |
| 5 | $SO_3H$ | H | " | " | bluish violet |
| 6 | H | $SO_3H$ | " | HO—⟨⟩—tert-amyl | bluish-violet |
| 7 | $SO_3H$ | H | " | HO—⟨⟩—tert-butyl | bluish-violet |

EXAMPLE 8

80 parts of a 50% potassium hydroxide solution are introduced into 200 parts of melted p-tert-butylphenol, and the temperature of the melt is pushed up to 180° as water is distilled off. There are then added 56 parts of the condensation product from 1-amino-4-bromoanthraquinone-2,6-disulphonic acid with 2,4,6-trimethylaniline (mesidine), and the mixture is stirred at 220° for a further 4 hours. The temperature is allowed to fall to 100°; the mixture is subsequently diluted with 600 ml of a 10% sodium hydroxide solution, and the dye base which has precipitated is filtered off with suction. The p-tert-butylphenol still present is distilled off with steam as in Example 1.

Six parts of this base are dissolved portionwise with 1.5 parts of N-methylolchloroacetamide in 25 parts of 95% sulphuric acid at 0° to 5°. Stirring is continued for a further 15 hours at 0° to 5°; the reaction mixture is subsequently poured into ice/water and the dye which precipitates is filtered off with suction. The residue is suspended in water, and the pH value is adjusted to 7 with sodium hydroxide solution. The dye of the formula

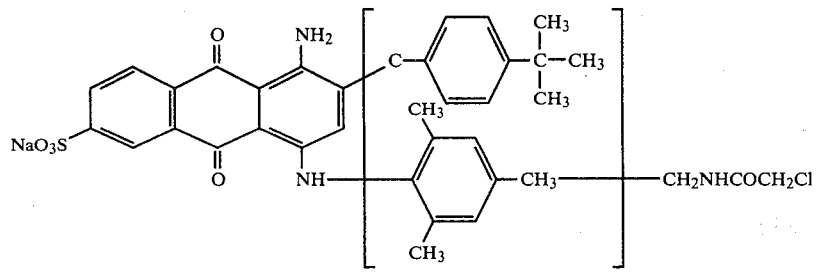

is isolated by the addition of 5 vol.% of sodium chloride. There is obtained a water-soluble, bluish-violet powder which exhibits on polyamide a very good affinity, and which gives dyeings having excellent fastness properties.

EXAMPLE 9

A dye bath is prepared from 4000 parts of water, 4 parts of ammonium acetate, 2 parts of the dye according to Example 1 and an amount of acetic acid sufficient to bring the pH value of the bath to 6.0 100 parts of a synthetic polyamide knitted fabric are introduced into the dye bath obtained; the temperature of the bath is raised in the course of half an hour to boiling, and the material is dyed at 100° for 45 minutes. There is thus obtained a bluish-violet dyeing which clearly illustrates the good affinity of the dye for the material.

I claim:

1. A new water-soluble anthraquinone dye which, in the form of the free acid, corresponds to the formula I

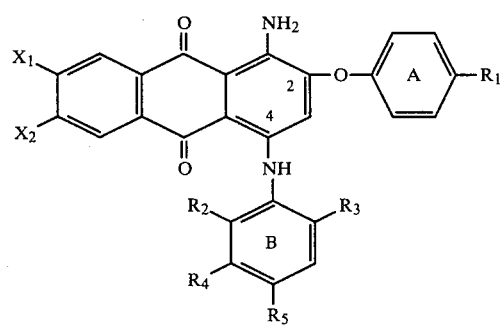

wherein
- $R_1$ represents a straight-chain or branched chain alkyl group having 4 to 8 carbon atoms,
- $R_2$ and $R_3$ independently of one another represent a straight-chain or branched-chain alkyl group having 1 to 4 carbon atoms,
- $R_4$ represents hydrogen, an optionally acylated amino group, or a fibre-reactive radical bonded by way of an amino group,
- $R_5$ represents hydrogen or a straight-chain or branched-chain alkyl group having 1 to 4 carbon atoms, and the phenylene rings A and/or B can be further substituted, with the proviso that one X of the symbols $X_1$ and $X_2$ represents the —$SO_3H$— group, and the other X represents hydrogen.

2. A new water-soluble anthraquinone dye according to claim 1, wherein $R_1$ represents branched-chain alkyl group having 4 to 8 carbon atoms.

3. A new water-soluble anthraquinone dye according to claim 2, wherein $R_1$ represents the tert-butyl group.

4. A new water-soluble anthraquinone dye according to claim 1, wherein $R_2$ and $R_3$ each represent the methyl group.

5. A new water-soluble anthraquinone dye according to claim 1, wherein $R_4$ represents hydrogen.

6. A new water-soluble anthraquinone dye according to claim 1, wherein $R_5$ represents a straight-chain alkyl group having 1 or 2 carbon atoms.

7. A new water-soluble anthraquinone dye according to claim 1, wherein $R_1$ represents the tert-butyl group, $R_2$, $R_3$ and $R_5$ each represent the methyl group, $R_4$ represents hydrogen, and one of the symbols $X_1$ and $X_2$ represents hydrogen and the other represents the sulpho group, and wherein the phenylene rings A and/or B are not further substituted.

8. Process for producing new water-soluble anthraquinone dyes according to claim 1 which, in the form of the free acid, correspond to the formula I.

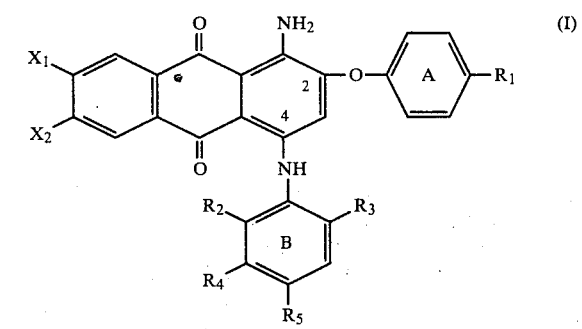

wherein
- $R_1$ represents a straight-chain or branched-chain alkyl group having 4 to 8 carbon atoms,
- $R_2$ and $R_3$ independently of one another represent a straight-chain or branched-chain alkyl group having 1 to 4 carbon atoms,
- $R_4$ represents hydrogen, an optionally acylated amino group, or a fibre-reactive radical bonded by way of an amino group,
- $R_5$ represents hydrogen or a straight-chain or branched-chain alkyl group having 1 to 4 carbon atoms, and the phenylene rings A and/or B can be further substituted, with the proviso that one X of the symbols $X_1$ and $X_2$ represents the —$SO_3H$— group, and the other X represents hydrogen, which process comprises reacting an anthraquinone compound which, in the form of the free acid, corresponds to the formula II

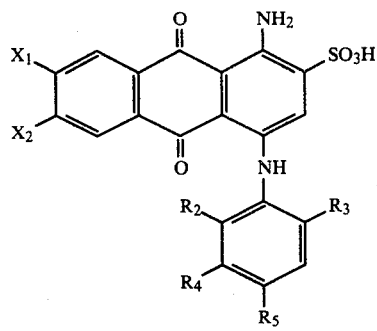

wherein the symbols $R_2$, $R_3$, $R_4$, $R_5$, $X_1$ and $X_2$ have the aforesaid meanings, with a p-alkylphenol of the formula III

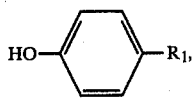

wherein $R_1$ has the aforesaid meaning, in the presence of acid-binding agents and at elevated temperature, to give an anthraquinone compound of the formula Ia wherein the symbols $R_1$, $R_2$, $R_3$, $R_4$, $R_5$, $X_1$ and $X_2$ have the aformentioned meanings; and optionally further substituting the phenylene ring of the phenoxy group in the 2-position, and/or the phenylene ring in the 4-position, of the anthraquinone nucleus.

9. Process according to claim 8, wherein an anthraquinone compound of the formula II wherein $R_4$ represents an amino group that can be acylated is used as starting material; and, after reaction with the phenol of the formula III, the reaction product is acylated.

10. Process according to claims 8 or 9, wherein the reaction of the anthraquinone compound of the formula II with the phenol of the formula III is performed at a temperature of 180° to 240° C., particularly 220° C.

* * * * *